United States Patent [19]
Bowman

[11] Patent Number: 5,875,565
[45] Date of Patent: Mar. 2, 1999

[54] DRYING APPARATUS FOR VEHICLES

[76] Inventor: Bradford K. Bowman, 5406 Crossbridge Dr., West Chester, Ohio 45069

[21] Appl. No.: 881,437

[22] Filed: Jun. 24, 1997

[51] Int. Cl.⁶ .................................................. F26B 19/00
[52] U.S. Cl. ............................................................. 34/666
[58] Field of Search ............................... 34/90, 218, 666, 34/476, 471, 477, 487, 493; 15/312.1, 312.2, 316.1

[56] References Cited

U.S. PATENT DOCUMENTS

| | | | |
|---|---|---|---|
| 2,448,834 | 9/1948 | Rousseau | 34/243 |
| 2,663,951 | 12/1953 | Kennison | 34/233 |
| 4,161,801 | 7/1979 | Day et al. | 15/316 R |
| 4,393,602 | 7/1983 | Smith | 34/34 |
| 4,561,193 | 12/1985 | Burger | 34/54 |
| 4,589,160 | 5/1986 | Day et al. | 15/316 R |
| 4,622,714 | 11/1986 | Tomasello | 15/316 R |
| 4,700,426 | 10/1987 | McElroy | 15/316 R |
| 4,907,533 | 3/1990 | Nelson et al. | 118/663 |
| 4,969,272 | 11/1990 | Schleeter et al. | 34/243 C |
| 4,991,316 | 2/1991 | Crotts | 34/243 C |
| 5,113,600 | 5/1992 | Telchuk | 34/90 |
| 5,421,102 | 6/1995 | McElroy et al. | 34/541 |
| 5,535,475 | 7/1996 | Sauter | 15/316.1 |
| 5,568,692 | 10/1996 | Crompton et al. | 34/666 X |

Primary Examiner—Henry A. Bennett
Assistant Examiner—Steve Gravini
Attorney, Agent, or Firm—Wood, Herron & Evans, L.L.P.

[57] ABSTRACT

A forced-air drying apparatus (20, 120) for an automated car wash includes at least four stages of nozzles (58a, 58b, 58c, 58d) and blowers (68a, 68b, 68c, 68d) spaced apart along the direction of vehicle travel through the apparatus, each stage having its nozzles oriented to direct air at high velocity generally downward and toward the vehicle (50). The vehicle is supported on a foraminous floor or grate (52) which is vertically spaced above a sloping foundation surface (34) such that a space (92) exists below the floor. Water which is stripped from the vehicle surfaces (75, 80) is carried downward by the downwardly moving air streams through the openings in the floor into the space below, where it is drained away by the sloping foundation surface. The apparatus further includes an insulated drying tunnel (38) which contains the nozzles and surrounds the vehicle, and at least one furnace (86) which is connected to receive air from the space below the floor, heat the air, and deliver the heated air to the blowers, thus continuously recirculating the air in a closed loop.

23 Claims, 4 Drawing Sheets

DRYING APPARATUS FOR VEHICLES

FIELD OF THE INVENTION

The present invention relates to an automatic drying apparatus and method for vehicles, and more particularly, to a forced air drying apparatus and method including a plurality of air nozzles for directing air at a vehicle that has been freshly washed and rinsed with water.

BACKGROUND OF THE INVENTION

Automated car washing machines typically include a drying apparatus which includes a blower and nozzle system arranged to direct air under pressure against the outer surfaces of a vehicle after the washing and rinsing operations have been finished, so as to strip water off the outer surfaces. Examples of such drying devices are shown in U.S. Pat. Nos. 5,535,475; 5,421,102; 4,969,272; 4,700,426; 4,589,160; 4,161,801; and 2,448,834. Each of the aforementioned patents shows a drying apparatus in which a plurality of air nozzles are arranged along a path of travel of the vehicle through the apparatus. The nozzles are so arranged that the drying process begins generally at the top front of the vehicle and proceeds generally downward and rearward toward the bottom sides of the vehicle. In this manner, water is progressively moved downward and rearward along the vehicle surfaces so that it eventually is blown or falls off the outer surfaces. This manner of arranging the nozzles provides an efficient stripping of water from the vehicle surfaces.

However, even with this type of nozzle arrangement, there remain at least two significant problems that are not solved by the apparatus in the aforementioned patents. First, in conventional drying apparatus such as shown in the aforementioned patents, water that is stripped from the vehicle falls or is blown onto the floor upon which the vehicle is supported. Because stripping of water from the surfaces requires that air be directed at high velocity in a generally downward direction toward the floor, water which is lying on the floor is often splashed by the high velocity air streams back up onto the vehicle. This results in inefficient drying because the same water is continually being stripped from the vehicle, redeposited onto the vehicle, restripped, and so on. This may also lead to incomplete drying, that is, water droplets remaining on the vehicle even after the vehicle has exited the drying apparatus. With such apparatus, the owner/operator of the car wash typically employs attendants who manually wipe the remaining water from the vehicle; alternatively, such as in some self-serve car washes, no manual wiping down of the vehicle is provided, resulting in an inferior result. Thus, with the conventional drying apparatus, the owner/operator either must incur labor costs which partially defeat the advantages of an automated car wash, or must accept inferior results.

A second problem that is not solved by the apparatus shown in the aforementioned patents is that even with a nozzle arrangement that efficiently strips water from the vehicle surfaces, inevitably some very small water droplets cannot be blown off the surfaces. For these very small droplets, the surface tension between the droplets and the vehicle surface exceeds the aerodynamic force imparted on the droplets by the air streams from the nozzles. In order to remove these small droplets, they must be evaporated. The rate of evaporation of a water droplet is highly dependent on ambient conditions, particularly the ambient temperature and relative humidity of the air surrounding the droplet. A drying apparatus for an automated car wash must be capable of evaporating small water droplets over a wide range of ambient conditions. Forcing high velocity air over the droplet increases the rate of evaporation, by lowering the vapor pressure of the air immediately adjacent to the droplet. Although forced air alone may be capable of completely evaporating the water droplets remaining on a vehicle surface given enough time, the high vehicle throughput rates that must be maintained in an economically practical car washing operation do not permit a vehicle to remain in the drying apparatus long enough to evaporate the water droplets using forced air alone, especially under extreme atmospheric conditions of, for example, 100 percent relative humidity and 90 degrees F.

One solution to this problem which has been proposed is shown in U.S. Pat. No. 2,663,951 issued to Kennison. That patent shows a drying apparatus in which hot water radiators are positioned with a blower within a casing so that the blower draws air over the radiators and then delivers the heated air to the nozzles. Heating the air is beneficial in increasing the evaporation rate. However, the apparatus shown in the Kennison patent suffers from two disadvantages. First, the intakes to the casing containing the radiators and blower are positioned close to the vehicle within the building which houses the car washing and drying apparatus. The result is that with continued use of the drying apparatus, water is continuously being evaporated into the air within the building, and the relative humidity within the space surrounding the vehicle will approach 100 percent even though the relative humidity outside the building may be significantly lower. Second, in a high flow rate air system, only modest increases in air temperature can be achieved with hot water radiators. Thus, Kennison notes that with his drying apparatus, one or two men are still required to remove water which remains on the vehicles after they have exited his apparatus.

SUMMARY OF THE INVENTION

Accordingly, it is an object of the present invention to provide a drying apparatus and method for vehicles in which water is efficiently stripped from the vehicle surfaces and is prevented from splashing back up onto the vehicle.

It is a further object of the invention to provide a vehicle drying apparatus and method which are capable of stripping and evaporating virtually all visible water from the vehicle outer surfaces such that the drying operation may be totally automated.

It is a still further object of the invention to provide such a drying apparatus and method which can achieve high throughput rates even under extreme ambient conditions.

The present invention achieves the objects noted above by providing a vehicle drying apparatus and method in which a vehicle within the drying apparatus is supported on a floor which is foraminous, such as a grate, vertically spaced above a foundation surface which supports the drying apparatus, such that an open volume exists between the floor and the underlying foundation surface. At least one air nozzle is arranged generally above the top of the vehicle and at least one air nozzle is arranged on each side of the vehicle. The nozzles are directed generally toward the vehicle and downward toward the foraminous floor and are connected to a suitable source of pressurized air so that air is forced out at high velocities from the nozzles to impinge on the outer surfaces of the vehicle. By virtue of the downward direction of the air streams from the nozzles, water is stripped off the vehicle surfaces and pushed along the surfaces in a downward direction, eventually being blown off or falling off the vehicle. The downwardly moving air streams carry the water to the foraminous floor and through the openings therein to the space beneath the floor. Thus, the water is prevented from splashing back up onto the vehicle once it is stripped off.

The apparatus preferably includes a conveyor for providing relative motion between the vehicle and the nozzles in a longitudinal direction parallel to the longitudinal centerline of the vehicle, and the nozzles are arranged into a plurality of nozzle stages spaced apart along the longitudinal direction. The conveyor may be a vehicle conveyor, in which case the nozzles are stationary and the vehicle is moved along the longitudinal direction through the drying apparatus; alternatively, the conveyor may be a movable carriage on which the nozzles are supported, in which case the vehicle remains stationary and the nozzles are moved longitudinally past the vehicle. There are preferably at least three nozzle stages. A first stage includes at least one nozzle adjacent an upstream end of the conveying means and located generally above the top of the vehicle. The first nozzle stage is oriented to direct air downward to impinge on the top surfaces of the vehicle, which causes water to be moved along the top surfaces in an outward direction away from the vehicle longitudinal centerline toward the sides of the vehicle. Preferably, the first stage nozzles also direct the air with some rearward component, i.e., in a direction opposite to the direction of vehicle travel relative to the nozzles. The second nozzle stage is spaced downstream of the first stage in the direction of relative vehicle travel, and includes at least one nozzle located generally above each juncture of the vehicle top and sides. The second stage nozzles are oriented to direct air generally downward and inward toward the junctures to that water which has been moved to the junctures by the first stage nozzles is moved downward along the vehicle sides. As with the first stage nozzles, the second stage nozzles preferably direct the air with some rearward component. The third nozzle stage is spaced downstream of the second stage and includes at least one nozzle located to each side of the vehicle. The third stage nozzles are oriented to direct air generally downwardly and inwardly so as to impinge on the vehicle sides and push water further downward along the sides toward the floor. Preferably, the third stage nozzles also impart some rearward component to the air. Thus, the three nozzle stages work in harmony to progressively move water downward toward the floor and rearward, so that the vehicle is dried generally top to bottom and front to rear.

Preferably, the third stage nozzles are located and oriented to direct air to impinge on upper portions of the vehicle sides, and a fourth nozzle stage is included. The fourth stage is spaced downstream from the third stage and includes at least one nozzle located to each side of the vehicle and oriented to direct air generally downward and inward so as to impinge on lower portions of the vehicle sides and push water further downward along the sides toward the floor.

The summary of the invention as just described applies to a "cold module" version of the invention. However, the invention may also be provided as a "hot module". In this embodiment, the drying apparatus includes a drying tunnel having at least a top wall and two opposite side walls, the tunnel having an open bottom. A vehicle within the tunnel is supported on a floor forming a bottom wall of the tunnel. The floor includes openings which permit air and water to pass through the floor. Beneath the floor is a pit, with the floor forming a top wall of the pit. The drying apparatus includes a forced-air heating system. The heating system includes an inlet which receives relatively low temperature air from the space within the pit, a heater which adds heat to the air, and an output for relatively high temperature air. A plurality of nozzles are disposed within the drying tunnel and are directed generally toward the vehicle and downward toward the openings in the floor. An air blower system is connected between the heating system output and the nozzles, receiving the relatively high temperature air from the heating system and delivering the heated air to the nozzles. The nozzles direct the air to impinge on the vehicle surfaces and carry water downward through the openings in the floor to the space below. Further, after the air has impinged on the vehicle, it enters the space below the floor, where it is drawn into the inlet of the heating system. Although the air entering into the pit is relatively low temperature compared to the temperature of the air exiting the heating system, the temperature in the pit is still higher than outside air temperature. Thus, air is continuously recirculated in a closed loop so that some of the energy used in heating the air is recovered. To reduce loss of heat, the drying tunnel walls preferably are insulated. The energy efficiency achieved by this arrangement permits the heating system to economically heat the air to relatively high temperatures, for example, about 160 degrees F., which results in rapid evaporation of small water droplets on the vehicle, thereby eliminating the need to manually dry the vehicle after it exits the tunnel, rendering the drying operation totally automatic. In addition to rapid evaporation of small water droplets provided by this "hot module" embodiment, the advantages of the "cold module" described above are also achieved.

Preferably, the heating system includes at least one forced-air furnace, and more preferably at least two such furnaces, and further includes a control system having a thermostat located within the drying tunnel and a controller connected to the thermostat and the furnaces. The controller is adapted to operate the furnaces so as to maintain the temperature within the drying tunnel within a predetermined range. Depending on outside weather conditions, the controller may operate all of the furnaces or may disable one or more of the furnaces. The furnaces may be connected either in parallel or in series, depending on the particular needs of a given installation and the thermal capacity of the individual furnaces.

The staged nozzle arrangement described above may equally advantageously be employed with the "hot module" embodiment of the invention. Additionally, the "hot module" preferably includes a fifth nozzle stage spaced downstream of the fourth stage. The fifth stage includes at least one nozzle located generally above the top of the vehicle and oriented similar to the first stage nozzle. This provides additional drying to the upper surfaces of the vehicle.

A drying apparatus in accordance with the principles of the invention may include both a "cold module" and a "hot module" as described above. In this embodiment, the cold module is located upstream and the hot module is located downstream, so that a vehicle first encounters the cold module, which efficiently strips most of the water from the vehicle surfaces. The hot module then further strips and evaporates water from the vehicle.

These and other objects and advantages of the present invention shall become more apparent from the accompanying drawings and the description thereof.

BRIEF DESCRIPTION OF THE DRAWINGS

The accompanying drawings, which are incorporated in and constitute a part of this specification, illustrate various embodiments of the invention and, together with the general description of the invention given above and the detailed description given below, serve to explain the principles of the invention.

DETAILED DESCRIPTION OF THE DRAWINGS

Figure 1:
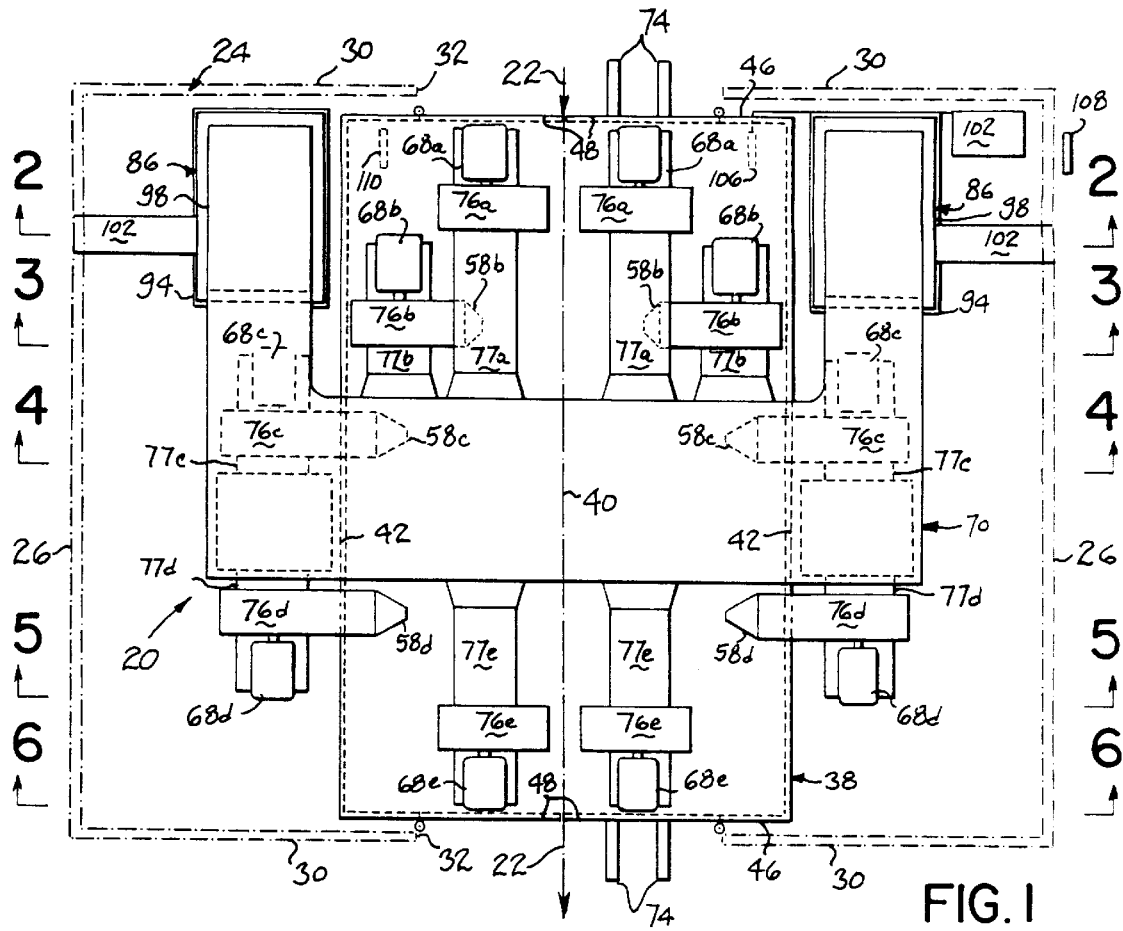
FIG. 1 is a top plan view of a "hot module" embodiment of the invention.

FIGS. 1–6 depict a "hot module" embodiment of the invention. FIG. 1 illustrates a top plan view of the drying apparatus 20 and FIGS. 2–6 depict cross-sectional views through the apparatus 20 at various locations spaced along the direction of vehicle travel as indicated by the arrows 22. The drying apparatus 20 is arranged within a building 24 which may be an existing structure of an automated car wash, or alternatively may be a structure built specifically to contain the drying apparatus 20. The building 24 includes generally vertical side walls 26, a roof structure 28, and generally vertical end walls 30. Each end wall 30 includes a passage 32 through which vehicles enter and exit the building, in conventional fashion. The building 24 further includes a foundation surface 34 which preferably lies at a vertical level below that of the ground 36 for reasons which will become apparent.

The apparatus 20 includes a drying tunnel 38 which is oriented with its longitudinal centerline 40 along a path which passes approximately centrally through the end passages 32. The tunnel 38 includes two opposite side walls 42 spaced about the tunnel centerline 40, a top wall 44 supported on the side walls 42, and end walls 46. As illustrated in FIG. 1, each end wall 46 includes movable doors 48 which may be opened to allow a vehicle to enter and exit the tunnel 38, and which may be closed after a vehicle has entered so as to substantially seal the tunnel 38 to prevent air from escaping from the tunnel into the interior of the building 24. Alternatively, the doors 48 may be omitted and the end walls 46 provided with passages for the passage of vehicles therethrough. The drying tunnel 38 preferably is insulated. A suitable construction for the walls of the tunnel is, for example, a foam core clad with stainless steel inside and aluminum outside.

Figure 2:
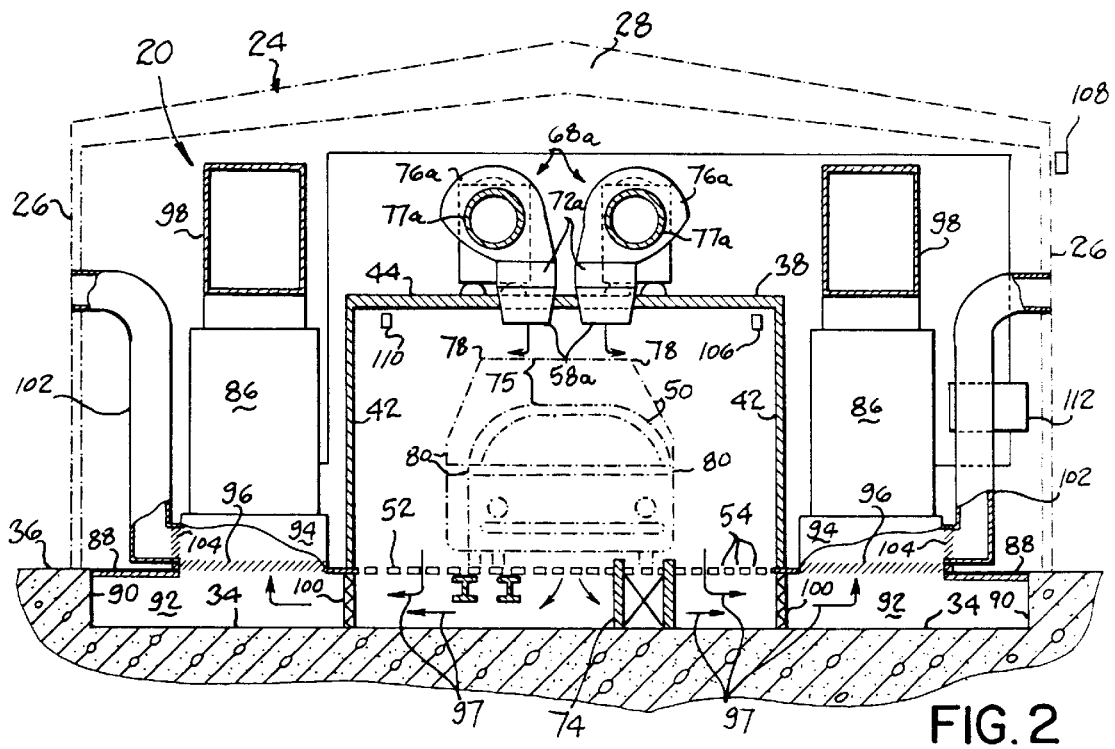
FIG. 2 is a cross-sectional view taken along line 2—2 of FIG. 1.

FIG. 2 illustrates in phantom two different sized vehicles 50 which alternatively may be located within the drying tunnel 38. The apparatus 20 includes a floor 52 which supports the vehicle 50 when it is in the tunnel 38. The floor 52 is foraminous, i.e., it has a plurality of openings 54 formed through it. The floor 52 is vertically spaced above the foundation surface 34, so that a space is defined between the floor 52 and the foundation surface 34, as described in further detail below. In order to avoid splashing of water from the floor area back up onto the vehicle 50, the floor 52 should include foraminous portions at least in the areas underlying the sides of the vehicle, and preferably the entire floor 52 should be foraminous so as to underlie vehicles 50 of all sizes.

The apparatus 20 includes a plurality of air nozzles 58a–e arranged with their discharge openings within the drying tunnel 38 and generally directed downward and toward the vehicle 50. Associated with each nozzle 58a–e is a blower 68a–e located outside the tunnel 38 and within the building 24, which draws air from a common supply air duct 70 located in the interior of the building 24 outside the tunnel 38 and supplies the air under pressure to its associated nozzle via a duct 72a–e which penetrates the tunnel 38. The nozzles are arranged into five stages spaced longitudinally along the direction of vehicle travel. The apparatus 20 includes conveying means for providing relative motion between the nozzles and the vehicle 50 so that the vehicle 50 progressively is exposed to the air streams from the nozzle stages one through five. As illustrated in the drawings, the conveying means is a conventional vehicle conveyor 74 which extends along a path through the building 24 and the drying tunnel 38 parallel to the centerline 40. However, the drying apparatus could alternatively include conveying means comprising a movable carriage or gantry supporting the nozzles, such that a vehicle within the tunnel 38 would remain stationary and the movable carriage would move the nozzles past the vehicle.

The nozzle stage number one includes a pair of nozzles 58a located side by side generally above the vehicle 50 and directed downward toward the top 75 of the vehicle 50, as best seen in FIG. 2. Each first stage nozzle 58a is connected via a duct 72a to the outlet plenum 76a of a blower 68a. Each blower 68a receives air from the common supply duct 70 via a duct 77a. Each nozzle 58a has a generally rectangular discharge opening, preferably measuring about 6 inches by about 18 inches, with the longer sides oriented generally transversely (i.e., in a plane normal to the longitudinal centerline 40) and in a horizontal plane. The discharge openings of nozzles 58a are preferably located at a height of about 6½ to 7 feet above the floor 52. Each blower 68a preferably has a rated horsepower of about 10 to 12 brake horsepower and a flowrate of about 5000 to 6000 cubic feet per minute. Each nozzle 58a provides an air discharge velocity of about 160 to about 250 feet per second. Preferably, each nozzle 58a is oriented so that its air discharge stream, although directed primarily downward, also has a rearward component, i.e., a component parallel to the longitudinal centerline 40 in the opposite direction of arrows 22. The air streams from the stage one nozzles 58a thus form an angle with respect to a vertical transverse plane of from about zero degrees to about 25 degrees, and preferably about 15 degrees, toward the rear of the vehicle 50.

Figure 3:
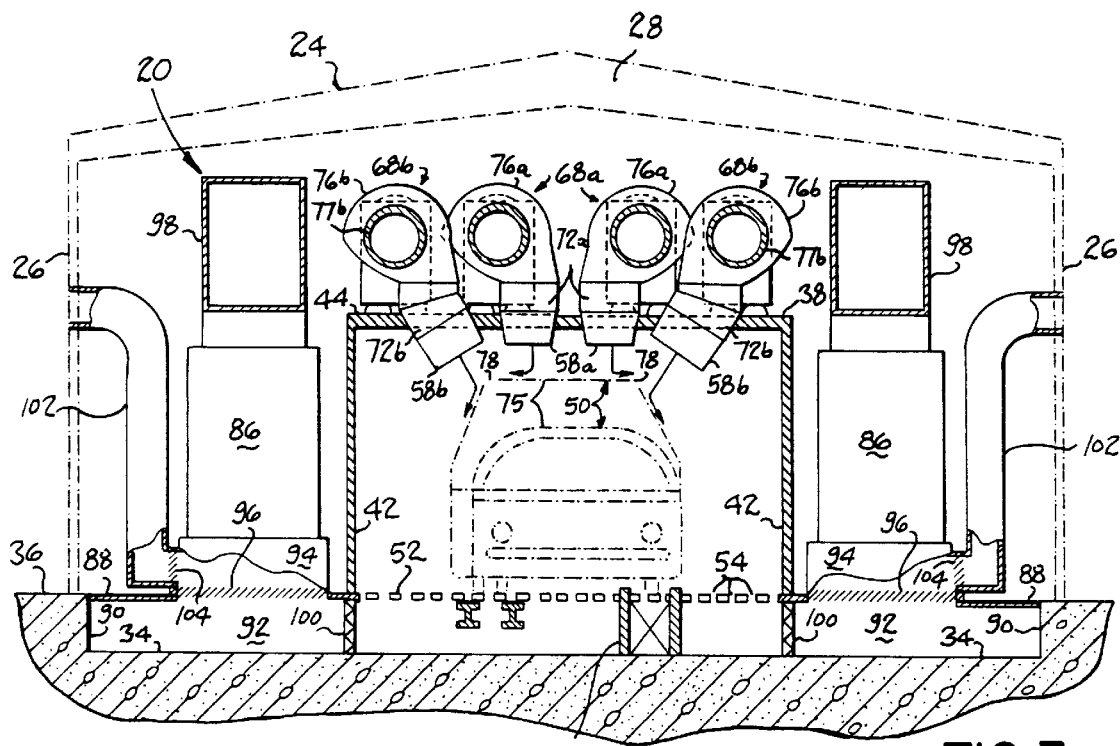
FIG. 3 is a cross-sectional view taken along line 3—3 of FIG. 1.

The nozzle stage number two is best seen in FIG. 3. The second stage is spaced downstream (i.e., along the direction of arrows 22) from the first stage and includes a nozzle 58b located generally above each juncture 78 of the vehicle top 75 and the vehicle sides 80. Each nozzle 58b has its discharge opening within the tunnel 38 and is oriented to direct air generally downward (i.e., with a component toward and normal to the floor 52) and inward (i.e., with a component toward and normal to the vertical plane containing the longitudinal centerline 40). Preferably, each nozzle 58b also imparts some rearward component to the air, directing the air streams rearwardly at an angle with respect to a vertical transverse plane of from about zero to about 25 degrees, and preferably about 15 degrees. Each nozzle 58b is connected via a duct 72b to the outlet plenum 76b of a blower 68b, each blower 68b in turn receiving air from the supply duct 70 via a duct 77b. The discharge opening of each nozzle 58b is generally rectangular and preferably measures about 6 inches by about 18 inches, with the longer sides being oriented generally transversely and upwardly inclined at a shallow angle (e.g., about 20 to about 40 degrees) relative to the horizontal in the direction of the centerline 40. Thus, each nozzle 58b directs the air streams at a downward angle with respect to a horizontal plane of from about 50 to about 70 degrees, and preferably about 60 degrees. Each blower 68b has a flow rate of about 5000 to about 6000 cfm. Blowers 68a and 68b are supported on the top wall 44 of the tunnel 38.

Figure 4:
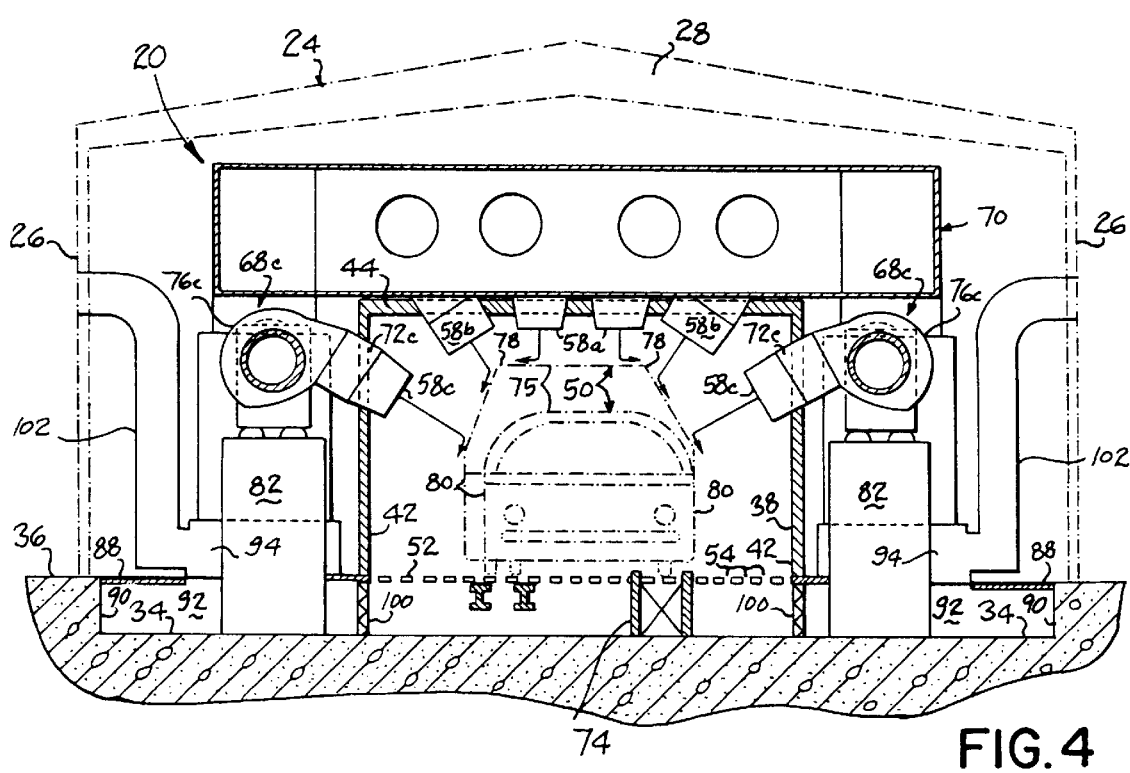
FIG. 4 is a cross-sectional view taken along line 4—4 of FIG. 1.

The nozzle stage number three is best seen in FIG. 4. The third stage is spaced downstream from the second stage and includes a nozzle 58c located to each side 80 of the vehicle 50 with its discharge opening within the tunnel 38. Each nozzle 58c is oriented to direct air generally downward and inward so as to impinge on upper portions of the vehicle sides 80, and preferably so as to include some rearward component as well, directing the air streams rearwardly at an angle with respect to a vertical transverse plane of from about zero to about 25 degrees, and preferably about 15 degrees. The nozzles 58c are connected via ducts 72c to the outlet plenums 76c of blowers 68c, which receive air from the supply duct 70 via ducts 77c and 79. The discharge openings of the nozzles 58c preferably measure about 6 inches by about 18 inches, with the longer sides being oriented generally transversely and upwardly inclined at a steep angle (e.g., about 50 to about 70 degrees) relative to the horizontal in the direction of the centerline 40. Thus, each nozzle 58c directs the air streams at a downward angle with respect to a horizontal plane of from about 20 to about 40 degrees, and preferably about 30 degrees. Each blower 68c has a flow rate of about 5000 to about 6000 cfm.

Figure 5:
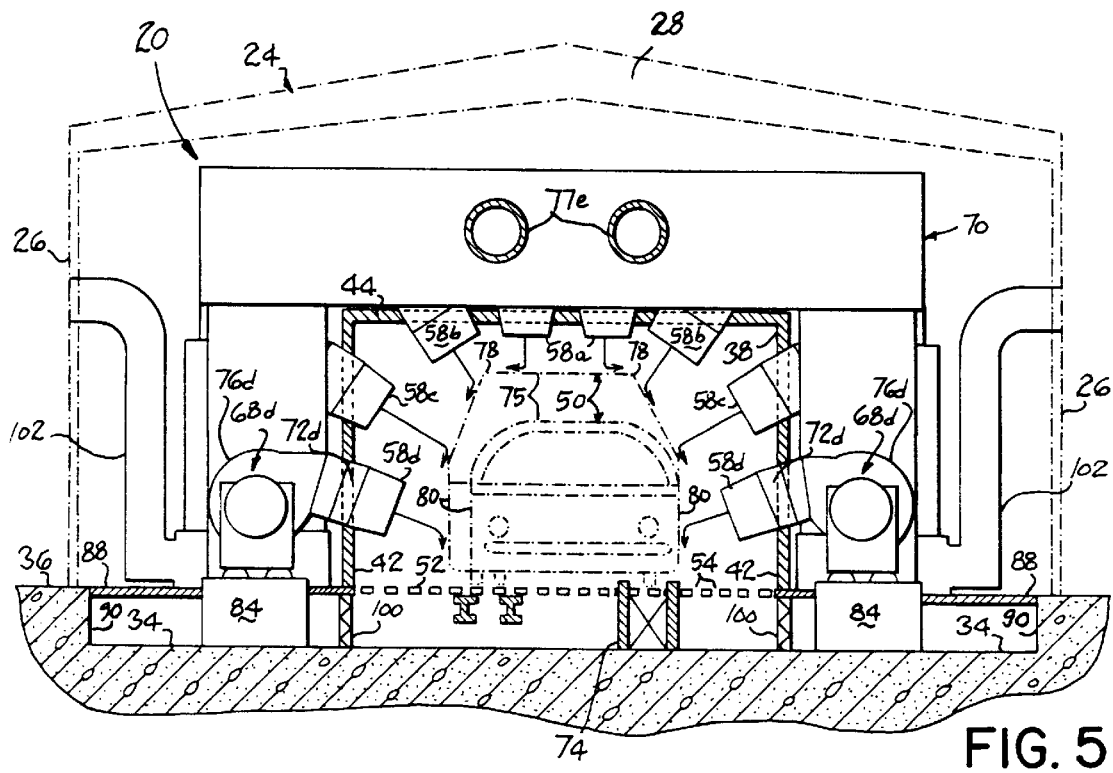
FIG. 5 is a cross-sectional view taken along line 5—5 of FIG. 1.

The nozzle stage number four is best seen in FIG. 5. The fourth stage is spaced downstream from the third stage and includes a nozzle 58d located to each side 80 of the vehicle 50 with its discharge opening within the tunnel 38. Each nozzle 58d is oriented to direct air generally downward and inward so as to impinge on lower portions of the vehicle sides 80, and preferably so as to include some rearward component as well, directing the air streams rearwardly at an angle with respect to a vertical transverse plane of from about zero to about 25 degrees, and preferably about 15 degrees. The nozzles 58d are connected via ducts 72d to the outlet plenums 76d of blowers 68d, which receive air from the supply duct 70 via ducts 77d and 79. Blowers 68c for the third stage and blowers 68d for the fourth stage are supported on concrete or steel pedestals 82 and 84, respectively, which are in turn supported on the building foundation surface 34 outside the tunnel 38. The dimensions for the discharge openings of the nozzles 58d are preferably about 6 inches by about 18 inches, with the longer sides being oriented generally transversely and upwardly inclined at a steep angle (e.g., about 60 to about 80 degrees) relative to the horizontal in the direction of the centerline 40. Thus, each nozzle 58d directs the air streams at a downward angle with respect to a horizontal plane of from about 10 to about 30 degrees, and preferably about 20 degrees. Each blower 68c has a flow rate of about 5000 to about 6000 cfm.

Figure 6:
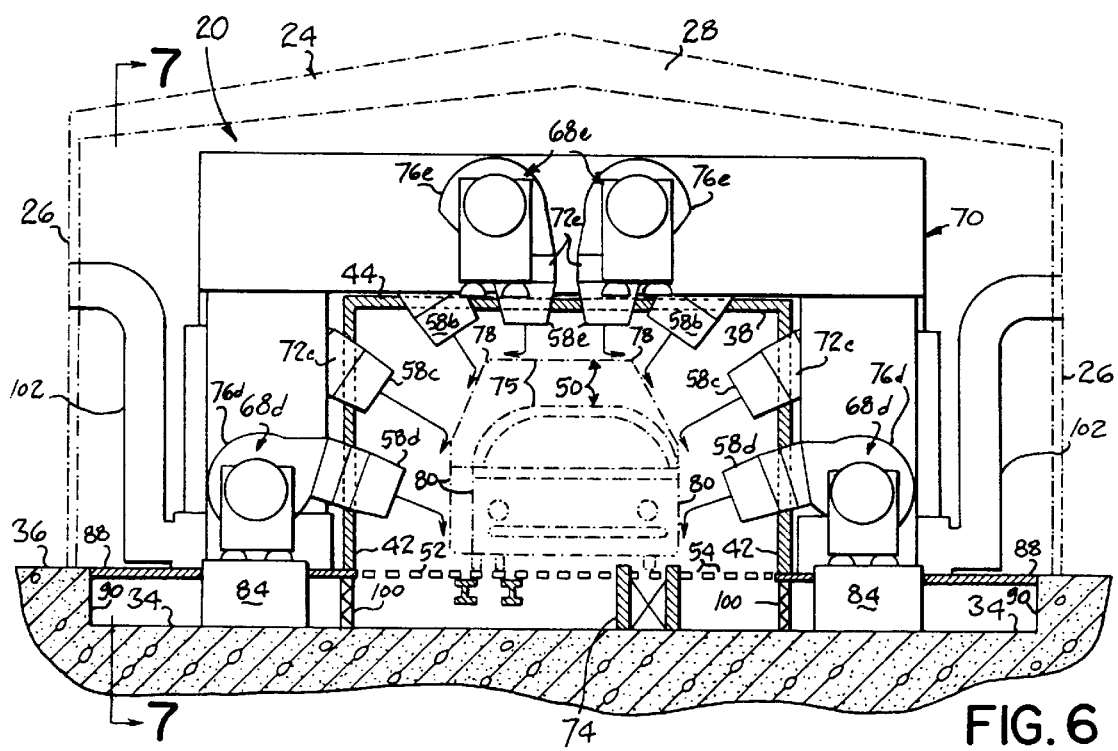
FIG. 6 is a cross-sectional view taken along line 6—6 of FIG. 1.
Figure 7:
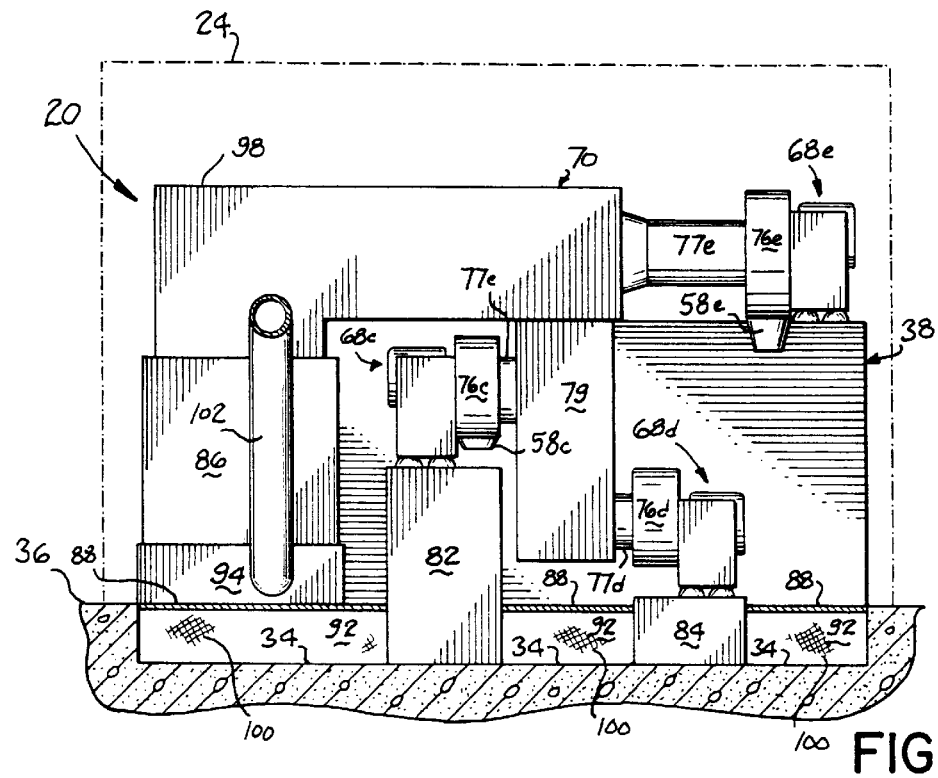
FIG. 7 is a cross-sectional view taken along line 7—7 of FIG. 6.

The nozzle stage number five is best seen in FIG. 6. The fifth stage is spaced downstream from the fourth stage and includes nozzles 58e located above the vehicle 50 and oriented similar to the nozzles 58a of the first stage. As with all of the other nozzles, the nozzles 58e direct the air with a rearward component at an angle of about zero to about 25 degrees, and preferably about 15 degrees, with respect to a vertical transverse plane. The nozzles 58e are connected via ducts 72e to the outlet plenums 76e of blowers 68e which are supported on the top wall 44 of the tunnel 38 and receive air from the supply duct 70 via ducts 77e. The discharge openings of the nozzles 58e preferably measure about 6 inches by about 18 inches, with the longer sides being oriented generally transversely and in a horizontal plane. Each blower 68e has a flow rate of about 5000 to about 6000 cfm.

The "hot module" drying apparatus 20 further includes a heating system for heating the air that is delivered to the nozzles 58a–e. The heating system includes at least one, and preferably at least two, forced-air furnaces 86 supported on a solid insulated floor 88 located outside the tunnel 38. The insulated floor 88 extends from each side wall 42 of the tunnel 38 outward to a foundation side wall 90 upstanding from the foundation surface 34 and extending lengthwise in a direction generally parallel to each tunnel side wall 42, it being understood that there are also foundation end walls (not shown) which extend lengthwise in a direction generally parallel to each tunnel end wall 46. Thus, the insulated floor 88 together with the foundation surface 34 and the side walls 90 and end walls form a pit defining a space 92. As best seen in FIG. 2, the space 92 extends beneath the foraminous floor or grate 52, and is connected via ducts 94 to the inlet of each furnace 86. A return air damper 96 is located within each duct 94.

Thus, as indicated by arrows 97 in FIG. 2, after impinging on the vehicle, air from the nozzles 58a–e passes through the foraminous floor or grate 52 and enters the space 92 beneath the floors 52 and 88, carrying with it water that has been stripped from the vehicle. The air that has entered into the space 92 is drawn into the ducts 94 through the return air dampers 96 and into the furnaces 86. The furnaces 86 heat the air, preferably to at least about 140 degrees F., and more preferably to at least about 160 degrees F. Natural gas furnaces having thermal capacities of two million BTUs are suitable for this purpose. The heated air is drawn into supply headers 98, which are in turn connected to the supply duct 70, as best seen in FIG. 1. It will therefore be appreciated that a closed loop air system is provided, in which air is continuously recirculated through the supply duct 70 to the blowers 68a–e, through the nozzles 58a–e and thence into the space 92 beneath the floors 52 and 88, through the ducts 94 to the furnaces 86, to the supply headers 98 and back to the supply duct 70. Preferably, the drying tunnel 38 is sufficiently sealed so that a positive pressure differential in maintained inside the tunnel. For instance, the pressure within the tunnel 38 is preferably about 1–2 percent higher than atmospheric pressure.

As shown in FIG. 2, preferably moisture elimination vanes 100 are disposed within the space 92 upstream of the return air dampers 96, in order to remove excess moisture from the air before it enters the furnaces 86. Additionally, the foundation surface 34 preferably is sloped downward in the direction of the wash and rinse areas (not shown) of the car wash so that water in the pit is drained to those areas.

The intake ducts 94 to the furnaces preferably are also connected to ducts 102 which are arranged to draw air from outside the building 24. Within each duct 102 is a damper 104 which can be closed to prevent air from being drawn into the furnaces 86 from the outside. The dampers 104 may be manually operated. However, preferably actuators (not shown) are provided for automatically opening the dampers 104 in response to signals from a humidity sensor 106 located within the tunnel 38 and a similar sensor 108 located outside the building 24 whenever the relative humidity within the tunnel 38 exceeds that outside the building 24. Conversely, the actuators close the dampers 104 when the humidity outside is greater than that in the tunnel 38.

The drying apparatus 20 preferably includes a heating control system including a thermostat 110 located inside the tunnel 38 and a controller 112. The controller 112 is connected to the thermostat 110 and to the furnaces 86. In known manner, the controller 112 is adapted to control the operation of the furnaces 86 in order to maintain the temperature within the tunnel 38 within a predetermined range as selected by an operator via the thermostat 110. The temperature within the tunnel 38 is preferably significantly higher than outside air temperature. For example, if the outside air temperature is 50 degrees F., the temperature in the tunnel 38 preferably is at least about 110 degrees F.

In use, a vehicle 50 is conveyed by the conveyor 74 so as to enter the upstream end of the drying tunnel 38. Upon entrance of the vehicle 50, the blowers 68a–e and furnaces 86 are started. The vehicle first encounters the first stage nozzles 58a which direct air generally downward and rearward to impinge on the top surfaces 75 of the vehicle, causing water on those surfaces to be pushed outward toward the vehicle sides 80 and rearward toward the back of the vehicle. Next, the vehicle encounters the second stage nozzles 58b which direct air generally downward, rearward, and inward toward the junctures 78 of the vehicle top 75 and sides 80, causing water which has been moved to those locations by the first stage nozzles to be pushed downward and rearward along the sides 80. The vehicle then encounters the third stage nozzles 58c which direct air generally downward, rearward, and inward toward upper portions of the vehicle sides 80, further pushing water downward and rearward along the vehicle sides 80. Next, the fourth stage nozzles 58d direct air generally downward, rearward, and inward toward lower portions of the vehicle sides 80, further pushing water downward and rearward along the vehicle sides 80. Finally, the fifth stage nozzles 58e direct air generally downward and rearward toward the top surfaces of the vehicle, which further helps to dry the upper surfaces of the vehicle.

The generally downwardly directed high velocity air streams from the nozzles 58a–e strip large water droplets from the surfaces of the vehicle 50 and carry those droplets downward through the foraminous floor or grate 52 to the pit, where the water is drained toward the wash and rinse areas of the car wash. Smaller droplets which cannot be stripped off by aerodynamic force alone are rapidly evaporated by the heated air. The result is a vehicle with virtually no visible water remaining on its outer surfaces.

Figure 8:
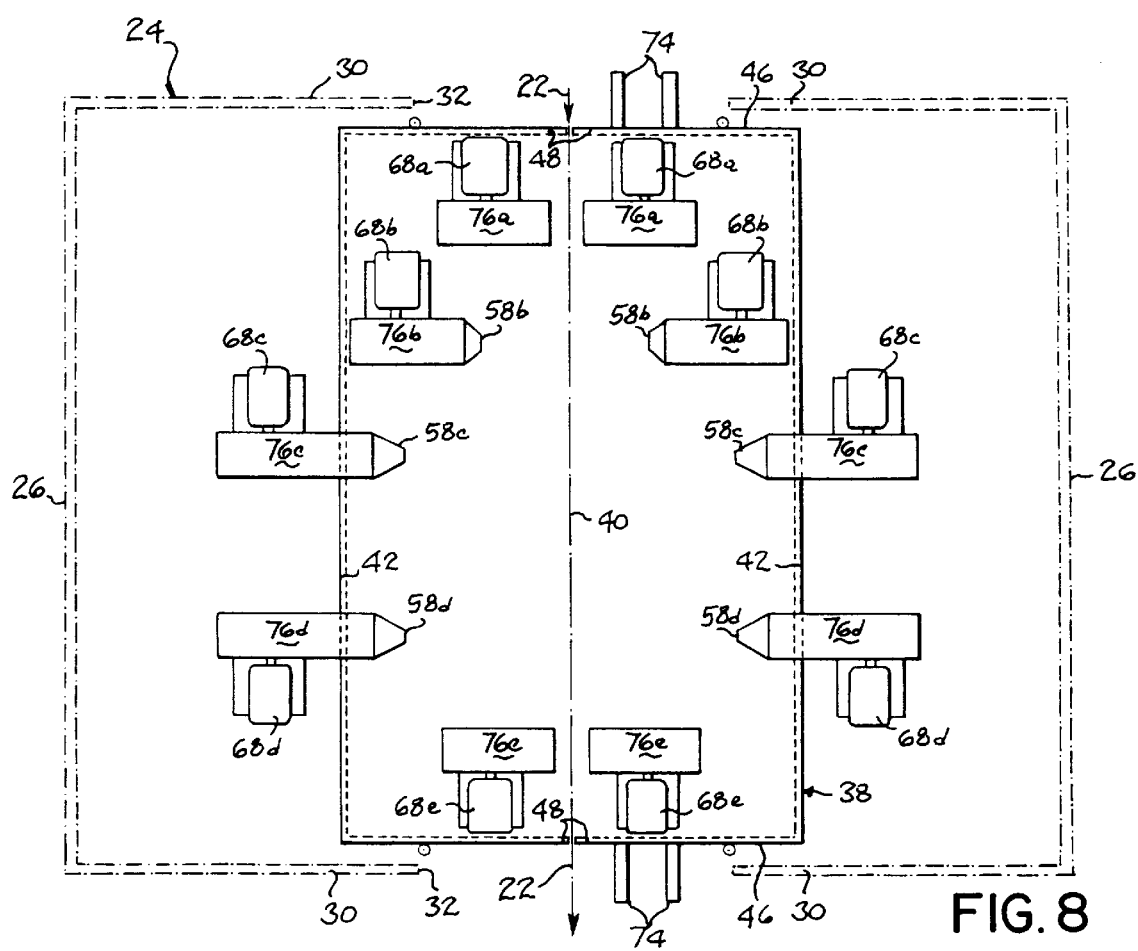
FIG. 8 is a top plan view of a "cold module" embodiment of the invention.

FIG. 8 illustrates a "cold module" embodiment of a drying apparatus 120. The cold module apparatus is substantially identical to the hot module drying apparatus 20, except the heating system and the fifth stage nozzles 58e are omitted. Although they are not shown, it will be understood that the cold module 120 includes the air ducts 70, 72, and 77. The cold module apparatus 120 may be suitable for use in naturally hot and dry climates, such as desert areas, where rapid evaporation of water may be accomplished without the aid of a heating system. Alternatively, in climates where rapid evaporation is difficult, the cold module 120 may be employed with the hot module 20 in the same car wash, the cold module 120 serving as a first water stripping station and the hot module 20 serving as a final water stripping and evaporating station.

While the present invention has been illustrated by a description of various embodiments and while these embodiments have been described in considerable detail, it is not the intention of the applicant to restrict or in any way limit the scope of the appended claims to such detail. Additional advantages and modifications will readily appear to those skilled in the art. For example, while the invention has been illustrated by a drying apparatus for automobiles, it will be appreciated that the invention may equally advantageously be applied to the drying of other types of vehicles, such as boats, aircraft, and the like. Thus, the term "vehicle" is not intended to be restricted to automobiles, but instead encompasses any type of vehicle which it may be desired to dry. The invention in its broader aspects is therefore not limited to the specific details, representative apparatus and method, and illustrative example shown and described. Accordingly, departures may be made from such details without departing from the spirit or scope of applicant's general inventive concept.

What is claimed is:

1. A forced-air drying apparatus for motor vehicles, comprising:

a floor adapted to support a vehicle, the floor being vertically spaced above a foundation surface supporting the drying apparatus, at least a portion of the floor underneath the vehicle being foraminous; and at least one air nozzle arranged generally above the vehicle and at least one air nozzle arranged generally on each side of the vehicle, the nozzles being connected to a source of pressurized air and directed generally toward the vehicle and downward toward the foraminous portion of the floor, whereby air is directed by the nozzles to impinge on outer surfaces of the vehicle and strip water therefrom and carry the water downward through the foraminous portion of the floor to the foundation surface such that the water cannot splash back up onto the vehicle.

2. The drying apparatus of claim 1, further comprising:

a conveyor providing relative motion between the vehicle and the nozzle stages in a longitudinal direction parallel to the longitudinal centerline of the vehicle.

3. The drying apparatus of claim 2, wherein the nozzles are stationary and the conveyor transports the vehicle along the longitudinal direction.

4. The drying apparatus of claim 2, wherein the vehicle remains stationary and the conveyor transports the nozzles along the longitudinal direction.

5. The drying apparatus of claim 2, wherein the nozzles comprise a plurality of nozzle stages spaced apart along the longitudinal direction, the nozzle stages including:

a first nozzle stage adjacent an upstream end of the conveyor, the first nozzle stage including at least one nozzle located generally above the top of the vehicle and oriented to direct air downward onto the top of the vehicle;

a second nozzle stage located downstream of the first stage, the second nozzle stage including at least one nozzle located generally above each juncture of the top and the sides of the vehicle and oriented to direct air generally downward and inward so as to impinge on said junctures and push water downward along the sides toward the floor; and a third nozzle stage located downstream of the second stage, the third nozzle stage including at least one nozzle located to each side of the vehicle and oriented to direct air generally downward and inward so as to impinge on the vehicle sides and push water further downward along the sides toward the floor.

6. The drying apparatus of claim 5, wherein the nozzles of the third nozzle stage are located and oriented so as to direct air to impinge on upper portions of the vehicle sides, and further comprising:

a fourth nozzle stage located downstream from the third stage, the fourth nozzle stage including at least one nozzle located to each side of the vehicle and oriented to direct air generally downward and inward so as to impinge on lower portions of the vehicle sides and push water further downward along the sides toward the floor.

7. The drying apparatus of claim 1, further comprising:

a drying tunnel adapted to contain a vehicle, the floor forming a bottom wall of the drying tunnel;

a pit disposed beneath the drying tunnel, the floor covering the pit, whereby fluid communication exists between the drying tunnel and the pit via the foraminous portion;

a forced-air heating system having an inlet adapted to receive relatively low temperature air, a heater to add heat to the air, and an output for relatively high temperature air; and an air blower system adapted to receive relatively high temperature air from the heating system output and deliver the air under pressure to the nozzles, whereby the nozzles direct heated air to impinge on outer surfaces of the vehicle and strip water therefrom and carry the water downward through the openings in the floor into the pit.

8. The drying apparatus of claim 7 wherein the forced-air heating system inlet communicates with the pit to recirculate air exiting the heating system output after it passes over a vehicle in the tunnel and through the foraminous portion of the floor into the pit.

9. The drying apparatus of claim 8 wherein the floor comprises a grate.

10. The drying apparatus of claim 5, wherein all of the nozzles are oriented to impart a rearward component of velocity to the air exiting the nozzles.

11. A forced-air drying apparatus for motor vehicles, comprising:

a drying tunnel adapted to contain a vehicle, the drying tunnel having an open bottom;

a floor adapted to support a vehicle within the drying tunnel, the floor located at the bottom to form a bottom wall of the drying tunnel and including openings therein located beneath a vehicle positioned in the tunnel for the passage of air and water therethrough;

a pit disposed beneath the drying tunnel, the floor covering the pit, whereby fluid communication exists between the drying tunnel and the pit via the openings in the floor;

a forced-air heating system adapted to receive relatively low temperature air from the interior of the pit, add heat to the air, and output relatively high temperature air;

a plurality of air nozzles disposed within the drying tunnel and directed generally toward the vehicle and downward toward the openings in the floor; and an air blower system adapted to receive relatively high temperature air from the heating system and deliver the air under pressure to the nozzles, whereby the nozzles direct heated air to impinge on outer surfaces of the vehicle and strip water therefrom and carry the water downward through the openings in the floor into the pit, and whereby air passing through the openings into the pit is recirculated through the heating system and blower system back through the nozzles.

12. The drying apparatus of claim 11 wherein the heating system includes at least one forced-air furnace.

13. The drying apparatus of claim 11 wherein the heating system includes at least two forced-air furnaces connected in parallel between the pit and the air blower system.

14. The drying apparatus of claim 11, further comprising a heating control system including a thermostat located within the drying tunnel and a controller connected to the thermostat and the furnaces, the controller being adapted to operate the furnaces so as to maintain the temperature within the drying tunnel within a predetermined range.

15. The drying apparatus of claim 11 wherein the heating system includes at least two forced-air furnaces connected in series between the pit and the air blower system.

16. The drying apparatus of claim 11, wherein the tunnel has an upstream end and a downstream end, and the nozzles comprise a plurality of nozzle stages spaced apart along a longitudinal direction parallel to a longitudinal centerline of a vehicle positioned within the tunnel, and further comprising:

a conveyor which provides relative motion between the vehicle and the nozzle stages in the longitudinal direction.

17. The drying apparatus of claim 11, wherein the nozzle stages comprise:

a first nozzle stage adjacent the upstream end of the tunnel, the first nozzle stage including at least one nozzle located generally above the top of the vehicle and oriented to direct air downward onto the top of the vehicle;

a second nozzle stage located downstream of the first stage, the second nozzle stage including at least one nozzle located generally above each juncture of the top and the sides of the vehicle and oriented to direct air generally downward and inward so as to impinge on said junctures and push water downward along the sides toward the floor; and a third nozzle stage located downstream of the second stage, the third nozzle stage including at least one nozzle located to each side of the vehicle and oriented to direct air generally downward and inward so as to impinge on the vehicle sides and push water further downward along the sides toward the floor.

18. The drying apparatus of claim 17, wherein the nozzles of the third nozzle stage are located and oriented so as to direct air to impinge on upper portions of the vehicle sides, and further comprising:

a fourth nozzle stage located downstream of the third stage and including at least one nozzle located to each side of the vehicle and oriented to direct air generally downward and inward so as to impinge on lower portions of the vehicle sides and push water further downward along the sides toward the floor.

19. The drying apparatus of claim 18, further comprising:

a fifth nozzle stage located downstream of the fourth stage and including at least one nozzle located above the top of the vehicle and oriented to direct air generally downward to impinge on the top of the vehicle.

20. The drying apparatus of claim 19, wherein the floor is a grate.

21. The drying apparatus of claim 20, wherein all of the nozzles are oriented to impart a rearward component of velocity to the air exiting the nozzles.

22. The drying apparatus of claim 11, wherein the nozzles are stationary and the conveyor transports the vehicle along the longitudinal direction.

23. The drying apparatus of claim 11, wherein the vehicle remains stationary and the conveyor transports the nozzles along the longitudinal direction.

* * * * *